United States Patent
Miyazaki et al.

(10) Patent No.: US 9,705,119 B2
(45) Date of Patent: Jul. 11, 2017

(54) ENERGY STORAGE DEVICE, ENERGY STORAGE APPARATUS, VEHICLE, AND METHOD FOR USING ENERGY STORAGE DEVICE

(71) Applicant: GS Yuasa International Ltd., Kyoto-shi, Kyoto (JP)

(72) Inventors: Akihiko Miyazaki, Kyoto (JP); Sumio Mori, Kyoto (JP); Tomonori Kako, Kyoto (JP); Kenta Nakai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 118 days.

(21) Appl. No.: 14/719,886

(22) Filed: May 22, 2015

(65) Prior Publication Data

US 2015/0340677 A1 Nov. 26, 2015

(30) Foreign Application Priority Data

May 26, 2014 (JP) .................... 2014-108411

(51) Int. Cl.
*H02J 7/00* (2006.01)
*H01M 2/16* (2006.01)
(Continued)

(52) U.S. Cl.
CPC ......... *H01M 2/1673* (2013.01); *H01M 2/166* (2013.01); *H01M 2/1686* (2013.01);
(Continued)

(58) Field of Classification Search
CPC .................................................. H01M 2/1673
(Continued)

(56) References Cited

U.S. PATENT DOCUMENTS

| 8,124,276 B2 | 2/2012 | Sato |
| 2006/0019154 A1 | 1/2006 | Yoshimura |

(Continued)

FOREIGN PATENT DOCUMENTS

| EP | 2685525 A1 | 1/2014 |
| EP | 2728651 | 5/2014 |

(Continued)

OTHER PUBLICATIONS

European Office Action dated Aug. 3, 2016 issued in the corresponding European patent application No. 15153069.8.

(Continued)

*Primary Examiner* — Suresh Memula
(74) *Attorney, Agent, or Firm* — Rankin, Hill & Clark LLP

(57) ABSTRACT

An energy storage device comprises a positive electrode, a negative electrode, a separator arranged between the positive electrode and the negative electrode, and a nonaqueous electrolyte. The negative electrode has a negative substrate layer, and a negative composite layer arranged on the surface of the negative substrate layer. The separator has a separator substrate layer. The negative composite layer contains a non-graphitizable carbon having a particle diameter D50 of 2.0 μm or more and 6.0 μm or less. A corrected negative electrode density, which is defined as a value obtained by dividing, by a thickness of the separator substrate layer, a value obtained by multiplying a density of the negative composite layer by a thickness of the negative composite layer, is 1.2 (g/cm$^3$) or more and 5.1 (g/cm$^3$) or less.

7 Claims, 7 Drawing Sheets

(51) Int. Cl.
*H01M 4/583* (2010.01)
*H01M 4/133* (2010.01)
*H01M 4/587* (2010.01)
*H01M 10/0525* (2010.01)
*H01M 10/44* (2006.01)
*H01M 4/02* (2006.01)
*H01M 2/20* (2006.01)
*H01M 10/42* (2006.01)

(52) U.S. Cl.
CPC .......... *H01M 4/133* (2013.01); *H01M 4/583* (2013.01); *H01M 4/587* (2013.01); *H01M 10/0525* (2013.01); *H01M 10/44* (2013.01); *H02J 7/007* (2013.01); *H01M 2/206* (2013.01); *H01M 2004/027* (2013.01); *H01M 2010/4292* (2013.01); *Y02E 60/122* (2013.01); *Y02T 10/7011* (2013.01)

(58) Field of Classification Search
USPC .......................................................... 320/134
See application file for complete search history.

(56) References Cited

U.S. PATENT DOCUMENTS

2011/0181249 A1* 7/2011 Deguchi ........... H01M 10/0525
                                                    320/149
2014/0017549 A1* 1/2014 Miyazaki ............. H01M 4/583
                                                    429/145
2015/0024277 A1   1/2015 Komatsu
2015/0229004 A1*  8/2015 Numata .............. H01M 2/1613
                                                    320/128
2015/0236335 A1   8/2015 Kim

FOREIGN PATENT DOCUMENTS

| EP | 2741355 A2 | 6/2014 |
| EP | 2772981 | 9/2014 |
| EP | 2824749 | 1/2015 |
| JP | 2000200622 A2 | 7/2000 |
| JP | 2001202997 A2 | 7/2001 |
| JP | 2002231312 A2 | 8/2002 |
| JP | 2003303625 A2 | 10/2003 |
| JP | 2004006164 A2 | 1/2004 |
| JP | 2006032246 A2 | 2/2006 |
| JP | 2007149400 A2 | 6/2007 |
| JP | 2007265666 A2 | 10/2007 |
| JP | 2010098020 A2 | 4/2010 |
| JP | 2014032755 A2 | 2/2014 |
| WO | 2013062056 | 5/2013 |
| WO | 2013118757 A1 | 8/2013 |
| WO | 2013133233 | 9/2013 |
| WO | 2014073898 A1 | 5/2014 |

OTHER PUBLICATIONS

Extended European Search Report dated Sep. 9, 2015 issued in the corresponding European patent application No. 15153069.8.

* cited by examiner

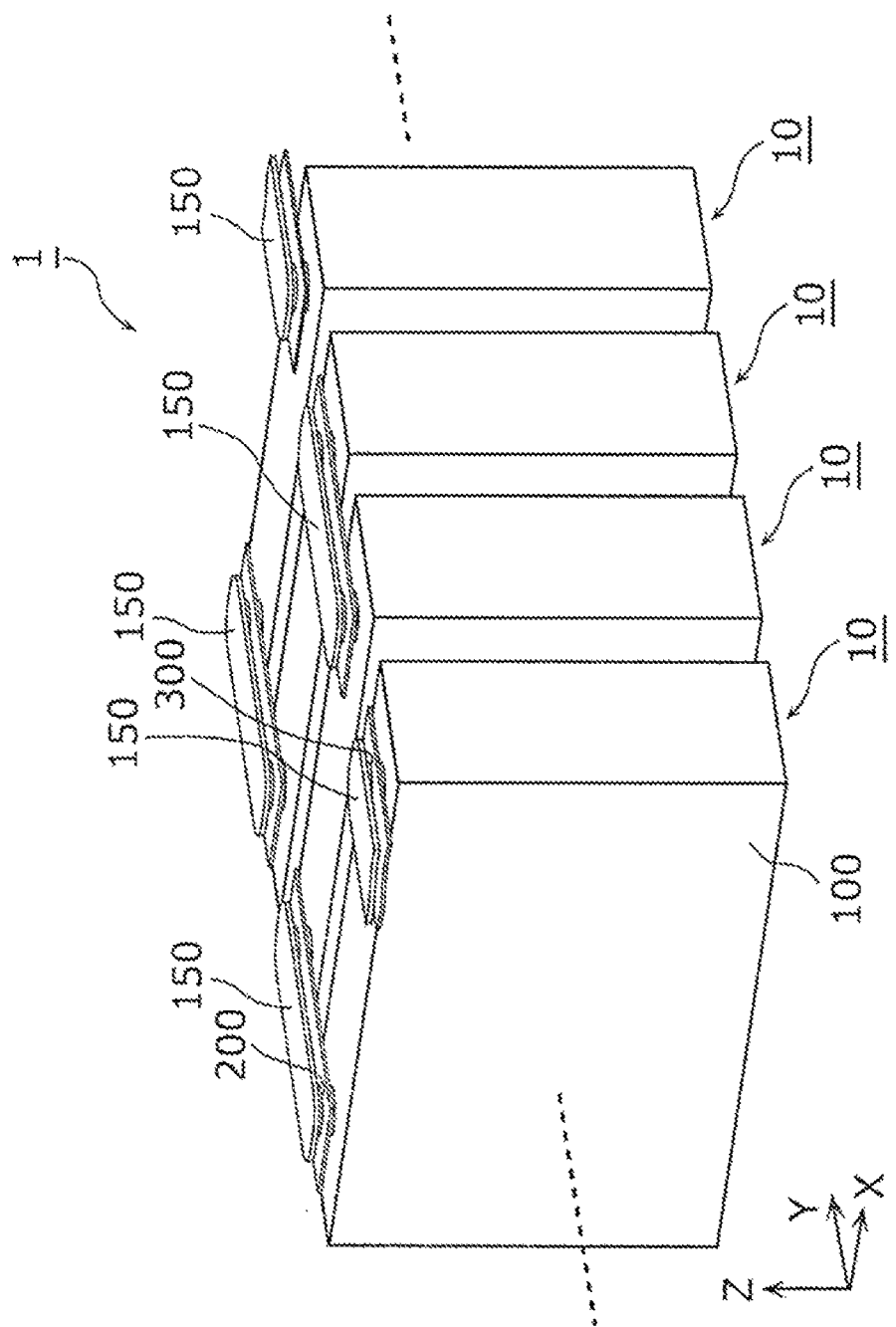

ENERGY STORAGE DEVICE, ENERGY STORAGE APPARATUS, VEHICLE, AND METHOD FOR USING ENERGY STORAGE DEVICE

CROSS-REFERENCE TO RELATED APPLICATIONS

This application is based on Japanese Patent Application No. 2014-108411 filed on May 26, 2014, the entire contents of which are hereby incorporated by reference.

FIELD

The present invention relates to an energy storage device including a positive electrode, a negative electrode, a separator arranged between the positive electrode and the negative electrode, and a nonaqueous electrolyte.

BACKGROUND

In recent years, as the effort to solve global environmental issues, a variety of energy storage devices such as lithium ion secondary batteries are widely used, for example, the shift from gasoline automobiles to hybrid automobiles and electric vehicles has been promoted and the use of electric bicycles has been increased. Therefore, in such an energy storage device, increases of a power and a capacity of the device are increasingly required. Thus, conventionally, an energy storage device which increases its power and capacity by reducing a thickness of a separator is proposed (for example, refer to JP-A-2006-32246).

However, in the conventional energy storage device in which the thickness of the separator is reduced, a power may be temporarily reduced when performing charge-discharge. Particularly, when charge-discharge is performed repeatedly at a high-rate cycle, in the conventional energy storage device, a power may be temporarily reduced to a large extent. Such a temporary reduction in power (hereinafter, referred to as a transient power degradation) after the high-rate cycle can be improved by switching charge-discharge of the energy storage device to a low-rate cycle or avoiding charging for a certain period of time, but it is necessary to change to operating conditions other than charge-discharging conditions in a high-rate cycle.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention was made to solve the above-mentioned problem, and it is an object of the present invention to provide an energy storage device capable of suppressing transient power degradation after the high-rate cycle even when the thickness of the separator is reduced.

In order to achieve the above-mentioned object, an energy storage device according to a first aspect of the present invention pertains to an energy storage device comprising a positive electrode, a negative electrode, a separator arranged between the positive electrode and the negative electrode, and a nonaqueous electrolyte. The negative electrode has a negative substrate layer, and a negative composite layer arranged on the surface of the negative substrate layer. The separator has a separator substrate layer. The negative composite layer contains a non-graphitizable carbon having a particle diameter D50 of 2.0 µm or more and 6.0 µm or less. A corrected negative electrode density, which is defined as a value obtained by dividing, by a thickness of the separator substrate layer, a value obtained by multiplying a density of the negative composite layer by a thickness of the negative composite layer, is 1.2 ($g/cm^3$) or more and 5.1 ($g/cm^3$) or less.

BRIEF DESCRIPTION OF THE DRAWINGS

The foregoing and other features of the invention will become apparent to one skilled in the art to which the present invention relates upon consideration of the invention with reference to the accompanying drawings, wherein:

FIG. 7 shows a perspective view of an appearance of the energy storage apparatus of the embodiment of the present invention.

DESCRIPTION OF EMBODIMENT

Figure 1:
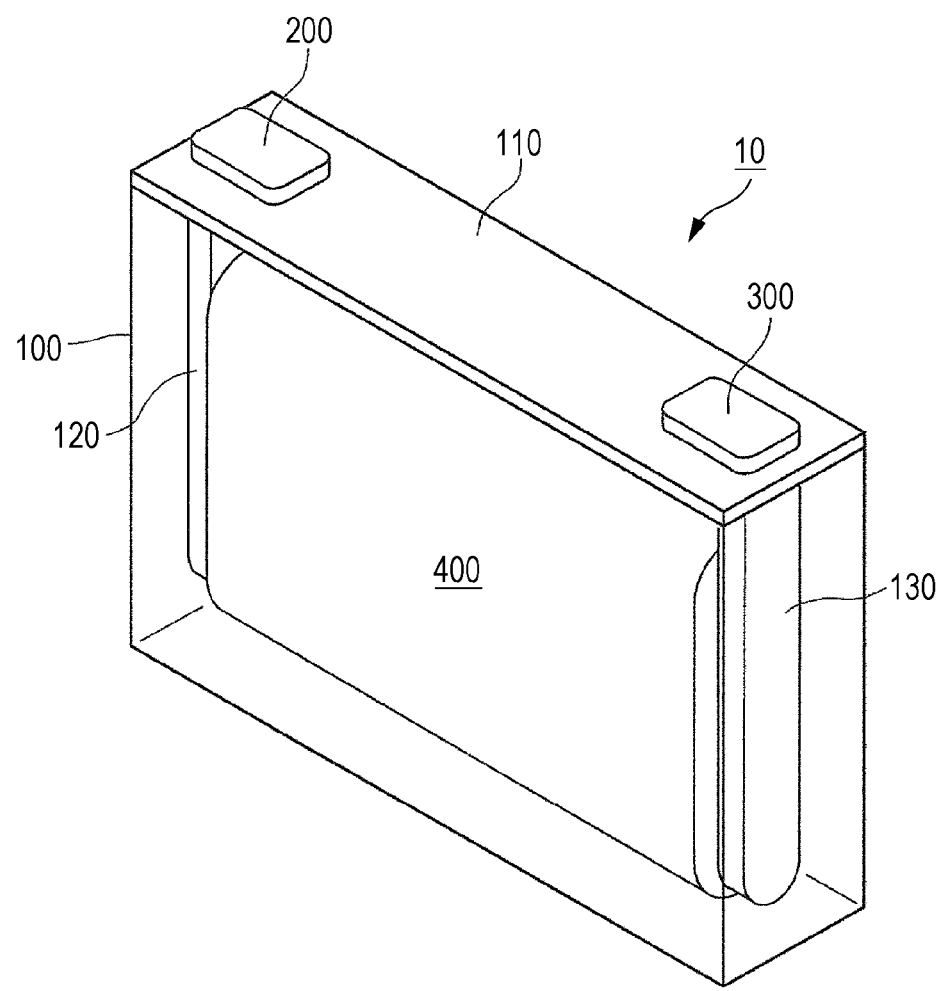
FIG. 1 shows a perspective view of an appearance of the energy storage device of the embodiment of the present invention.

Preferred embodiments of the present invention will be described hereinafter.

In order to achieve the above-mentioned object, an energy storage device according to a first aspect of the present invention pertains to an energy storage device comprising a positive electrode, a negative electrode, a separator arranged between the positive electrode and the negative electrode, and a nonaqueous electrolyte. The negative electrode has a negative substrate layer, and a negative composite layer arranged on the surface of the negative substrate layer. The separator has a separator substrate layer. The negative composite layer contains a non-graphitizable carbon having a particle diameter D50 of 2.0 µm or more and 6.0 µm or less. A corrected negative electrode density, which is defined as a value obtained by dividing, by a thickness of the separator substrate layer, a value obtained by multiplying a density of the negative composite layer by a thickness of the negative composite layer, is 1.2 ($g/cm^3$) or more and 5.1 ($g/cm^3$) or less.

Thereby, in the energy storage device, the negative electrode contains a non-graphitizable carbon having a particle diameter D50 of 2.0 µm or more and 6.0 µm or less as a negative active material, and the corrected negative electrode density is 1.2 ($g/cm^3$) or more and 5.1 ($g/cm^3$) or less. In general, when the thickness of the separator is reduced with respect to the negative composite layer, the separator is susceptible to the effect of the expansion/contraction of the negative electrode during charge-discharge, and the transient power degradation occurs after the high-rate cycle. For this situation, the present inventors made earnest investigations and repeated experiments, and consequently they found that the transient power degradation can be suppressed in the above-mentioned constitution of an energy storage device even when the thickness of the separator is reduced. That is, the present inventors found that when the non-graphitizable carbon having a particle diameter D50 of 2.0 μm or more and 6.0 μm or less is used as the negative active material, and the corrected negative electrode density representing a relative density of the negative composite layer to a thickness of the separator is adjusted to 1.2 (g/cm$^3$) or more and 5.1 (g/cm$^3$) or less, it is possible to reduce the influence which the separator draws from the negative electrode, and suppress the transient power degradation resulting from the ununiformity of a current distribution. Thereby, the transient power degradation after the high-rate cycle can be suppressed in the energy storage device in which the thickness of the separator is reduced.

Further, a ratio of PC impregnation of the separator, which represents a mass ratio between propylene carbonate contained in the separator by impregnation and the separator, may be 40% or more and 70% or less.

Herein, the present inventors made earnest investigations and repeated experiments, and consequently they found that in the energy storage device in which the thickness of the separator is reduced, the transient power degradation after the high-rate cycle can be suppressed when a ratio of PC impregnation of the separator is 40% or more and 70% or less. As a result of this, in the energy storage device, the occurrence of the micro short-circuit can also be suppressed while suppressing the transient power degradation after the high-rate cycle when a ratio of PC impregnation of the separator is 40% or more and 70% or less.

The corrected negative electrode density may be 2.2 (g/cm$^3$) or more and 4.4 (g/cm$^3$) or less.

Herein, the present inventors made earnest investigations and repeated experiments, and consequently they found that the transient power degradation after the high-rate cycle can be suppressed more effectively when the corrected negative electrode density is 2.2 (g/cm$^3$) or more and 4.4 (g/cm$^3$) or less. As a result of this, in the energy storage device, it is possible to suppress the transient power degradation after the high-rate cycle more effectively when the corrected negative electrode density is 2.2 (g/cm$^3$) or more and 4.4 (g/cm$^3$) or less.

Further, the separator may have a thickness of 26 μm or less.

Thereby, a thickness of the separator is 26 μm or less, and therefore a power and a capacity can be increased.

Further, the separator may further have an inorganic layer containing inorganic particles on the surface of the separator substrate layer.

Thereby, the failure of the separator due to expansion/contraction of the positive electrode and the negative electrode is prevented, and the strength of the separator can be kept.

Further, an energy storage apparatus according to the present invention comprises the above-described energy storage device and a bus bar member electrically connected to the energy storage device.

Further, a vehicle according to the present invention includes the above-described energy storage apparatus.

Further, a method for using an energy storage device comprises charging or discharging the above-described energy storage device at 8 CA or more when an available discharge capacity is defined as 1 CAh.

Hereinafter, an energy storage device of an embodiment of the present invention will be described with reference to drawings. Incidentally, all of embodiments described below show a preferable specific example of the present invention. Numerical values, shapes, materials, constituents, arrangement positions of the constituents and connecting form shown in the following embodiments are just examples and are not gist to limit the present invention. Further, the constituent, not according to independent claim representing the most generic concept of the present invention, among the constituents in the following embodiments will be described as optional constituents constituting more preferable aspect.

First, the constitution of an energy storage device 10 will be described.

[1. Overall Constitution]

Figure 2:
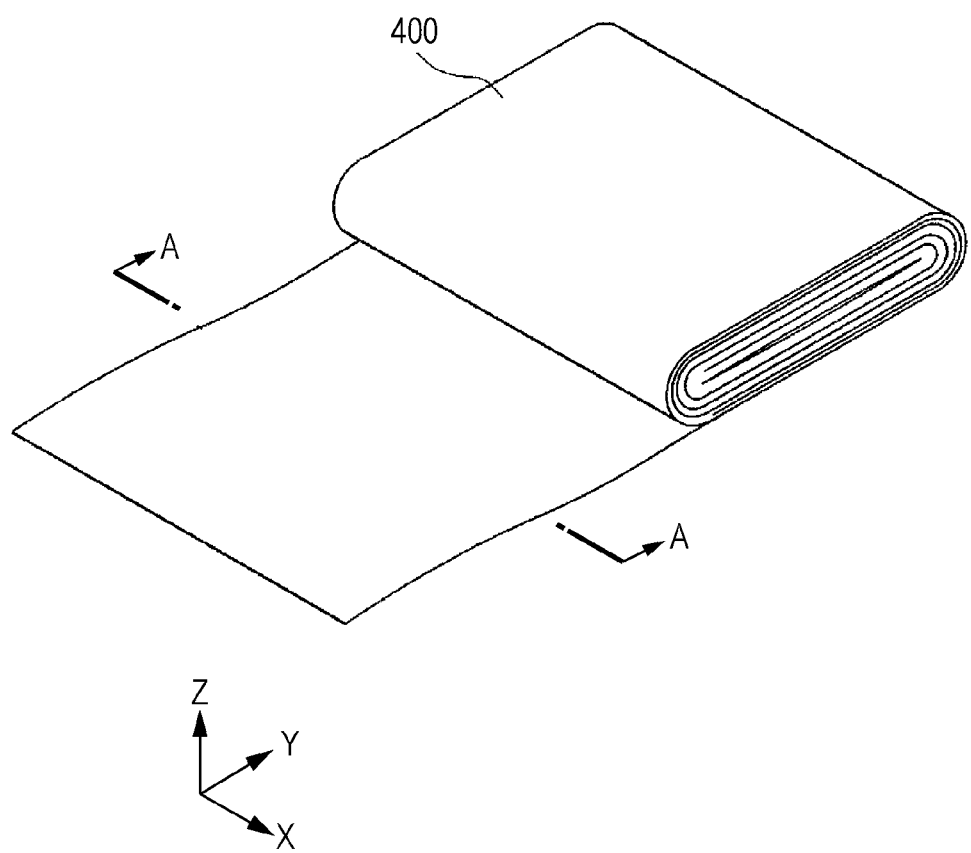
FIG. 2 is a perspective view showing a constitution of an electrode assembly of the embodiment of the present invention.

FIG. 1 is a perspective view of an appearance of the energy storage device 10 of the embodiment of the present invention. Incidentally, this drawing is a perspective view of an inside of a container. FIG. 2 is a perspective view showing a constitution of an electrode assembly 400 of the embodiment of the present invention. Incidentally, this drawing is a partially developed view of the wound electrode assembly 400 shown in FIG. 1.

The energy storage device 10 is a secondary battery capable of charging electricity and discharging the electricity, and more specifically a nonaqueous electrolyte secondary battery such as a lithium ion secondary battery. For example, the energy storage device 10 is a secondary battery which is used for hybrid electric vehicles (HEV), plug-in hybrid electric vehicles (PHEV), and electric vehicles (EV). Incidentally, the energy storage device 10 is not limited to the nonaqueous electrolyte secondary battery, and may be a secondary battery other than the nonaqueous electrolyte secondary battery, or may be a capacitor.

As shown in these drawings, the energy storage device 10 includes a container 100, a positive terminal 200 and a negative terminal 300, and the container 100 includes a lid plate 110 serving as a top wall. Within the container 100, an electrode assembly 400, a positive current collector 120 and a negative current collector 130 are arranged. Incidentally, a liquid such as an electrolyte solution (nonaqueous electrolyte) is enclosed in the container 100 of the energy storage device 10; however the liquid is not shown in a drawing.

The container 100 is constituted by a housing body having a rectangular tube-shape with a bottom made of metal, and a metallic lid plate 110 closing an opening of the housing body. Further, the container 100 is adapted to be able to hermetically seal the inside by welding or the like of the lid plate 110 to the housing body after housing the electrode assembly 400 in the container 100.

The electrode assembly 400 is a member which includes a positive electrode, a negative electrode and a separator and can store electricity. Specifically, the electrode assembly 400 is formed by winding layers, in which a negative electrode, a positive electrode and a separator sandwiched therebetween are arranged, so as to have an oblong shape as a whole. Incidentally, in FIGS. 1 and 2, the electrode assembly 400 having the oblong shape is shown, but the electrode assembly 400 may have a circular shape or an elliptical shape. Further, the form of the electrode assembly 400 is not limited to a wound type, and it may have the form of superimposed flat plate-shaped electrode plates (stack type). Detailed constitution of the electrode assembly 400 will be described later.

The positive terminal 200 is an electrode terminal electrically connected to the positive electrode of the electrode assembly 400, and the negative terminal 300 is an electrode terminal electrically connected to the negative electrode of the electrode assembly 400. That is, the positive terminal 200 and the negative terminal 300 are metallic electrode terminals for leading the electricity stored in the electrode assembly 400 to the external space of the energy storage device 10, and for introducing electricity in the internal space of the energy storage device 10 in order to store the electricity within the electrode assembly 400.

The positive current collector 120 is arranged between the positive electrode of the electrode assembly 400 and a side wall of the container 100, and is a member having conductivity and rigidity, the member being electrically connected between the positive terminal 200 and the positive electrode of the electrode assembly 400. Incidentally, the positive current collector 120 is formed of aluminum or an aluminum alloy as with a positive substrate layer of the electrode assembly 400 described later.

Further, the negative current collector 130 is arranged between the negative electrode of the electrode assembly 400 and a side wall of the container 100, and is a member having conductivity and rigidity, the member being electrically connected between the negative terminal 300 and the negative electrode of the electrode assembly 400. Incidentally, the negative current collector 130 is formed of copper or a copper alloy as with a negative substrate layer of the electrode assembly 400 described later.

Further, materials, which are commonly proposed to be used for lithium ion batteries or the like, can be used for the nonaqueous electrolyte (electrolyte solution) to be enclosed in the container 100, and various materials can be selected. In the energy storage device 10, a combination of the following organic solvent and an electrolytic salt can be used as the nonaqueous electrolyte. The positive composite layer, the negative composite layer, and the separator are impregnated with the nonaqueous electrolyte in the container 100. Examples of the organic solvent of the nonaqueous electrolyte include, but are not limited to, one compound or a mixture of two or more of compounds of cyclic carbonic acid esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran and derivatives thereof, ethers such as 1,3-dioxane, 1,4-dioxane, 1,2-dimethoxyethane, 1,4-dibutoxyethane, and methyl diglyme; nitriles such as acetonitrile and benzonitrile; dioxolane and derivatives thereof, and ethylene sulfide, sulfolane, sultone and derivatives thereof. Incidentally, a publicly known additive may be added to the nonaqueous electrolyte. Among these nonaqueous electrolyte solutions, a mixture of ethylene carbonate, dimethyl carbonate and methyl ethyl carbonate is preferably used since conductivity of lithium ions is maximized by use of the mixture.

Further, examples of electrolytic salts contained in the nonaqueous electrolyte include inorganic ionic salts containing one of lithium (Li), sodium (Na), and potassium (K) such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$, and $KSCN$; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate, and lithium dodecylbenzenesulfonate. These ionic compounds may be used alone or in combination of two or more of them.

An energy storage device according to the present embodiment is preferably an energy storage device for a hybrid vehicle. The energy storage device for a hybrid vehicle is charged and discharged at a large current of 8 CA or more when an available discharge capacity is defined as 1 CAh. That is, the energy storage device according to the present embodiment is preferably charged and discharged at a large current of 8 CA or more when an available discharge capacity is defined as 1 CAh.

1 CA is a current value when the available discharge capacity is discharged in one hour. Here, the available discharge capacity means a discharge capacity which is obtained by discharging the energy storage device from charged state (100% SOC) to discharged state (0% SOC).

The energy storage device equipped with the hybrid vehicle or the plug-in hybrid vehicle is charged and discharged at a higher current compared to the energy storage device equipped with the electric vehicle. In the energy storage device according to the present embodiment, the transient power degradation after the high-rate cycle can be suppressed.

Next, a detailed constitution of the electrode assembly 400 will be described.

[2. Constitution of Electrode Assembly]

Figure 3:
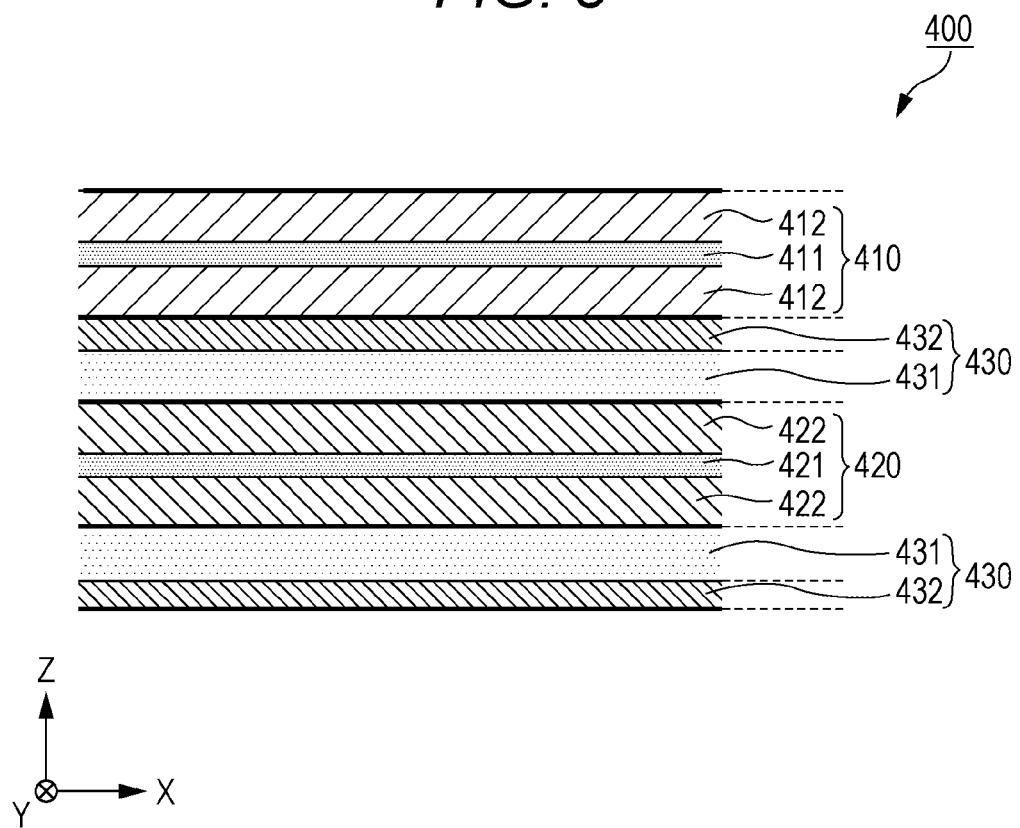
FIG. 3 is a sectional view showing the constitution of the electrode assembly of the embodiment of the present invention.

FIG. 3 is a sectional view showing the constitution of the electrode assembly 400 of the embodiment of the present invention. Specifically, this drawing is a view showing a cross section taken on line A-A of a developed portion of the wound electrode assembly 400 shown in FIG. 2.

As shown in FIG. 3, the electrode assembly 400 is formed by superimposing a positive electrode 410, a negative electrode 420, and two separators 430. Specifically, the separator 430 is arranged between the positive electrode 410 and the negative electrode 420.

[2.1 Constitution of Positive Electrode]

First, the positive electrode 410 will be described. The positive electrode 410 has a positive substrate layer 411 and a positive composite layer 412.

The positive substrate layer 411 is a long belt-like conductive current collecting foil made of aluminum or an aluminum alloy. Incidentally, as the current collecting foil, a publicly known material, such as nickel, iron, stainless steel, titanium, baked carbon, conductive polymer, conductive glass, Al—Cd alloy or the like, can also be appropriately used.

The positive composite layer 412 is an active material layer formed on the surface of the positive substrate layer 411. That is, the positive composite layer 412 is formed on each of both surfaces in a plus direction and in a minus direction of a Z-axis of the positive substrate layer 411. The positive composite layer 412 includes a positive active material, a conductive additive and a binder.

As the positive active material used in the positive composite layer 412, publicly known compounds can be used without a particular limit, and among the publicly known compounds, it is preferred to use a compound which is a positive active material capable of absorbing/releasing lithium ions and is represented by $Li_aNi_bM1_cM2_dW_xNb_yZr_zO_2$ (in the formula, a, b, c, d, x, y, and z satisfy the relationship of $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, $0 \leq z \leq 0.1$ and $b+c+d=1$, and M1 and M2 are respectively at least one element selected from the group consisting of Mn, Ti, Cr, Fe, Co, Cu, Zn, Al, Ge, Sn and Mg), or a compound represented by $LiNi_xMn_yCo_zO_2$ (x+y+z=1, x<1, y<1, z<1).

Incidentally, a particle diameter D50 of the positive active material is preferably 2 to 8 μm. Herein, the particle diameter D50 refers to a particle diameter at which a cumulative amount of particles reaches 50% of a volume (cumulative distribution) in measuring a volumetric distribution of particles using a laser diffraction and scattering method.

The type of the conductive additive to be used for the positive composite layer 412 is not particularly limited, and it may be metal or may be nonmetal. As a metal conductive additive, a material formed of a metal element such as copper or nickel may be used. As the nonmetallic conductive additive, carbon materials such as graphite, carbon black, acetylene black and Ketjen Black can be used.

A type of a binder to be used for the positive composite layer 412 is not particularly limited as long as it is stable to a solvent or an electrolyte solution used in manufacturing an electrode and stable to an oxidation-reduction reaction during charging/discharging. As the binder, for example, thermoplastic resins such as polytetrafluoroethylene (PTFE), polyvinylidene fluoride (PVDF), polyethylene and polypropylene; and polymers having rubber elasticity such as ethylene-propylene-diene terpolymer (EPDM), sulfonated EPDM, styrene-butadiene rubber (SBR) and fluorine-contained rubber can be used singly or in combination of two or more of them.

Incidentally, the positive electrode 410 may have an undercoat layer between the positive substrate layer 411 and the positive composite layer 412.

The undercoat layer is a thermosetting undercoat layer which is formed on the surface (in FIG. 3, both surfaces in a plus direction and in a minus direction of a Z-axis) of the positive substrate layer 411 and is different in a resin type or a composite ratio from the positive composite layer 412. Further, the undercoat layer contains a binder (organic binder) and a conductive additive.

Herein, examples of a resin for a material of the organic binder to be used for the undercoat layer include at least one selected from the group consisting of chitin-chitosan derivatives, cellulose derivatives, resin fluorides, synthetic rubbers, polyamides, polyimides, polyolefins and polyacryls.

Specific examples of the chitin-chitosan derivatives include at least one hydroxyalkyl chitosan selected from the group consisting of hydroxyethyl chitosan, hydroxypropyl chitosan, hydroxybutyl chitosan, alkylated chitosans, and the like. Examples of the resin fluorides include polyvinylidene fluoride, polytetrafluoroethylene and the like. Examples of the synthetic rubbers include a styrene-butadiene rubber, an acrylic rubber, a nitrile rubber and the like. Examples of the polyolefins include low-density polyethylene, high-density polyethylene, polypropylene and the like. Examples of polyacryls include ethylene glycol dimethacrylate, propylene glycol dimethacrylate and the like. Incidentally, it is preferred that the above hydroxyalkyl chitosan is mixed with an organic acid such as salicylic acid, pyromellitic acid, citric acid, trimellitic acid or the like, and cross-linked to form an organic binder. One example of the cellulose derivatives includes CMC (carboxymethylcellulose) and a salt thereof. Specific examples of the CMC include H—CMC, Na—CMC, $NH_4$—CMC and the like.

Incidentally, the organic binder of the undercoat layer preferably contains at least one selected from among chitosan derivatives and cellulose derivatives. An additive amount of the organic binder is preferably 20 to 80% by mass, and more preferably 50 to 75% by mass with respect to all raw materials of the undercoat layer. When this amount of the organic binder is added to the undercoat layer, adhesion strength of the undercoat layer is enhanced, adhesion of an interface between the positive substrate layer 411 and the positive composite layer 412 is secured, and electric conductivity can be maintained.

Further, as the conductive additive to be used for the undercoat layer, particles having a high electric conducting property are used. Examples of the conductive additive include at least one selected from the group consisting of carbon-based materials such as carbon black, acetylene black, Ketjen Black and the like; and metal fine particles of iron, nickel, copper, aluminum and the like.

Incidentally, an additive amount of the conductive additive of the undercoat layer is preferably 5 to 98% by mass, and more preferably 15 to 90% by mass with respect to all raw materials of the undercoat layer. When this amount of the conductive additive is added to the undercoat layer, an appropriate electric conducting property can be maintained.

In the positive electrode and the negative electrode of a nonaqueous electrolyte secondary battery, expansion and contraction in an electrode plate thickness are repeated in a charge-discharge process of the battery. With respect to the expansion of the positive electrode and the negative electrode, the negative electrode is generally more expanded than the positive electrode. Moreover, the expansion of the negative electrode becomes larger with an increase of a packing density of an active material used in each electrode. Therefore, the separator is compressed at the time of expansion of the negative electrode in a charge-discharge process. Therefore it is assumed that an ion conductive property of the separator is decreased with repeated charge-discharge cycles, and the transient power degradation occurs particularly after the high-rate cycle. In the present embodiment, constitutions of the negative electrode and the separator for suppressing the transient power degradation after the high-rate cycle are proposed.

[2.2 Constitution of Negative Electrode]

Next, the negative electrode 420 will be described. The negative electrode 420 has a negative substrate layer 421 and a negative composite layer 422.

The negative substrate layer 421 is a long belt-like conductive current collecting foil made of copper or a copper alloy. Incidentally, as the current collecting foil, a publicly known material, such as nickel, iron, stainless steel, titanium, baked carbon, conductive polymer, conductive glass, Al—Cd alloy or the like, can also be appropriately used.

The negative composite layer 422 is an active material layer formed on the surface (in FIG. 3, both surfaces in a plus direction and in a minus direction of a Z-axis) of the negative substrate layer 421, and the negative composite layer 422 is arranged on both surfaces of the negative substrate layer 421 so as to sandwich the negative substrate layer 421. The positive composite layer 422 contains a negative active material, a conductive additive and a binder.

As the negative active material to be used for the negative composite layer 422, non-graphitizable carbon (hard carbon) is used. The non-graphitizable carbon has a particle diameter D50 of 2.0 μm or more and 6.0 μm or less.

When a thickness of the separator is reduced to increase a power, current lines on the negative electrode become susceptible to the negative active material. Meanwhile, when non-graphitizable carbon, in which the diameter of the particle is regulated, is used as the negative active material as described above, it becomes possible to uniformize the resistance of the ion pathway during charge/discharge.

Moreover, it becomes possible to suppress variations of charge-discharge depth in the negative electrode by inclined SOC (state of charge)-potential gradient. Thereby, the transient power degradation after the high-rate cycle can be suppressed.

Since the conductive additive to be used for the negative composite layer 422 is similar to the conductive additive to be used for the positive composite layer 412, a detailed explanation thereof will be omitted.

A type of a binder to be used for the negative composite layer 422 is not limited as long as it is stable to a solvent or an electrolyte solution used in manufacturing an electrode and stable to an oxidation-reduction reaction during charging/discharging. As the binder, for example, thermoplastic resins such as polytetrafluoroethylene (PTFE), polyvinylidene fluoride (PVDF), polyethylene and polypropylene; and polymers having rubber elasticity such as ethylene-propylene-diene terpolymer (EPDM), sulfonated EPDM, styrene-butadiene rubber (SBR) and fluorine-contained rubber can be used singly or in combination of two or more of them.

[2.3 Constitution of Separator]

Next, the separator 430 will be described. The separator 430 is a long belt-like separator arranged between the positive electrode 410 and the negative electrode 420, and is wound in a longitudinal direction (Y-axis direction) together with the positive electrode 410 and the negative electrode 420 and a plurality of this wound layers are superimposed to form an electrode assembly 400. The separator 430 includes a separator substrate layer 431 and an inorganic coating layer 432.

The separator substrate layer 431 is a main body of the separator 430 and resin porous membranes in general can be used. As the separator substrate layer 431, for example, a resin porous membrane, which has a cloth or non-woven fibers of polymer, natural fibers, hydrocarbon fibers, glass fibers or ceramic fibers, is used. The resin porous membrane preferably has a cloth or non-woven polymer fibers. Particularly, it is preferred that the resin porous membrane has a polymer cloth or fleece, or is such a cloth or a fleece. The polymer fibers preferably have non-conductive fibers of a polymer selected from polyacrylonitrile (PAN), polyamide (PA), polyester, for example, polyethylene terephthalate (PET) and/or polyolefin (PO), for example, polypropylene (PP) or polyethylene (PE) or a mixture or a composite membrane of such polyolefins. Further, the resin porous membrane may be a polyolefin microporous membrane, non-woven fabric, paper or the like, and preferably a polyolefin microporous membrane.

Next, the inorganic coating layer 432 will be described. The inorganic coating layer 432 is a layer which is provided for at least one surface of the separator substrate layer 431 and disposed on the separator substrate layer 431. Incidentally, the inorganic coating layer 432 is coated on the upper surface of the separator substrate layer 431 in FIG. 3; however, the inorganic coating layer 432 may be coated on the lower surface of the separator substrate layer 431 or may be coated on both surfaces. Further, the inorganic coating layer 432 does not have to be arranged on the separator substrate layer 431 as long as it is arranged between the positive electrode 410 and the negative electrode 420; however, the inorganic coating layer 432 is preferably arranged on the separator substrate layer 431 as shown in FIG. 3. If surface potential of the positive electrode becomes higher, insulation properties of the separator substrate layer 431 may be deteriorated by the oxidation of the separator substrate layer 431. The discharge capacity is reduced by a reduction of insulation properties of the separator substrate layer 431. Therefore, it is preferred to use a resin which is not oxidized and does not become conductive for the inorganic coating layer 432. Thereby, oxidation of the separator 430 is suppressed and charge-discharge cycle performance is improved. A thickness of the inorganic coating layer 432 is preferably 0.1 μm or more and 10 μm or less.

Specifically, the inorganic coating layer 432 is an inorganic layer containing heat-resistant inorganic particles as heat-resistant particles. As the inorganic particles, both synthetic particles and natural particles can be employed without limitation. For example, the inorganic particles comprise one material, a mixture or a composite compound of one or more inorganic materials of the following inorganic materials. Examples of the inorganic particles include fine particles of oxides such as iron oxide, $SiO_2$, $Al_2O_3$, $TiO_2$, $BaTiO_2$, ZrO and alumina-silica composite oxides; fine particles of nitrides such as aluminum nitride and silicon nitride; fine particles of slightly soluble ionic crystals such as calcium fluoride, barium fluoride, and barium sulfate; fine particles of covalent crystals such as silicon and diamond; fine particles of clays such as talc and montmorillonite; and materials derived from mineral source such as Boehmite, zeolite, apatite, kaolin, mullite, spinel, olivine, sericite, bentonite and mica, or manmade substance thereof; and the like. Further, the inorganic particles may be fine particles which are provided with electrical insulating properties by surface treating the surfaces of the conductive fine particles such as metal fine particles; oxide fine particles, for example, $SnO_2$, indium-tin oxide (ITO); and carbonaceous fine particles such as carbon black and graphite with a material having electrical insulating properties (e.g., the material constituting the above-mentioned electric insulating inorganic particles). Particularly, as a material of the inorganic particles, $SiO_2$, $Al_2O_3$, and alumina-silica composite oxide are preferred.

Further, the inorganic coating layer 432 is preferably formed by applying a solution obtained by dispersing inorganic particles and a binder in a solvent onto the separator substrate layer 431. Examples of the binder include polyacrylonitrile, polyvinylidene fluoride, a copolymer of polyvinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Particularly, from the viewpoint of electrochemical stability, polyacrylonitrile, polyvinylidene fluoride, polyhexafluoropropylene and polyethylene oxide are preferred. Further, the binder to be used in the present embodiment is particularly preferably polyvinylidene fluoride (PVDF), polyacrylic acid, polymethacrylic acid or styrene-butadiene rubber. Incidentally, the same binder as that described above is used for a binder used in the positive electrode 410 or the negative electrode 420.

Herein, in the present embodiment, the corrected negative electrode density, which is defined as a value obtained by dividing, by a thickness of the separator substrate layer 431, a value obtained by multiplying a density (g/cm$^3$) of the negative composite layer 422 by a thickness of the negative composite layer 422, is 1.2 (g/cm$^3$) or more and 5.1 (g/cm$^3$) or less. Moreover, the corrected negative electrode density is preferably 2.2 (g/cm$^3$) or more and 4.4 (g/cm$^3$) or less.

Further, the separator 430 preferably has the characteristic that a ratio of PC impregnation of the separator, which represents a numeric value obtained by multiplying, by 100, a volume of PC contained in the separator by impregnation divided by a volume of the separator, is 40% or more and 70% or less.

The ratio of PC impregnation of the separator can be adjusted by the surface modification treatment using the corona discharge treatment.

The separator 430 preferably includes the inorganic coating layer 432; however it does not have to include the inorganic coating layer 432.

Incidentally, in consideration of the effect on battery characteristics, a thickness of the separator 430 is preferably 26 μm or less. Thereby, it is possible to increase a power and a capacity. The separator 430 preferably has air permeability of 180 (sec/100 cc) or less.

A value obtained by dividing, by the thickness of the separator substrate layer 431, a difference between the thickness of the negative composite layer 422 in charging the energy storage device 10 at 4.2 V and the thickness of the negative composite layer 422 in completely discharging at 2.0 V, is preferably 0.05 or more and 0.5 or less.

Moreover, the present invention relates to not only to the above-mentioned energy storage device but also to an energy storage apparatus including at least one energy storage device mentioned above.

For example, as shown in FIG. 7, an energy storage apparatus 1 in accordance with one embodiment of the present invention includes a plurality of energy storage devices 10. Further, the energy storage apparatus 1 includes a plurality of bus bar members 150, each of which electrically connects the energy storage devices 10.

That is, the energy storage apparatus 1 includes a plurality of bus bar members 150 and each of bus bar members 150 electrically connects the positive terminal and the negative terminal of the adjacent energy storage devices 10 of the plurality of the energy storage devices 10. As a result, the plurality of the energy storage devices 10 are connected in series.

Furthermore, the energy storage apparatus 1 may further include an outer container containing the plurality of the energy storage devices 10 or a control board which monitors the charging conditions and discharging conditions of the plurality of the energy storage devices.

Moreover, one embodiment of the present invention provides a vehicle comprising the above-mentioned energy storage apparatus. The vehicle is preferably a hybrid vehicle.

Next, the reason why the energy storage device 10 having the above-mentioned constitution can suppress the transient power degradation will be described in detail.

EXAMPLES

First, a method of manufacturing an energy storage device 10 will be described. Specifically, batteries as the energy storage devices in Examples 1 to 44 and Comparative Examples 1 to 14 described later were prepared in the following manner. Incidentally, all of Examples 1 to 44 relates to the energy storage device 10 according to the embodiment described above.

(1-1) Preparation of Positive Electrode $LiNi_xMn_yCo_zO_2$ (x+y+z=1, 0<x<1, 0<y<1, 0<z<1) was used as the positive active material. Further, acetylene black was used for the conductive additive, PVDF was used for the binder, and these materials were mixed so that the positive active material, the conductive additive and the binder were 90% by mass, 5% by mass, and 5% by mass, respectively. An aluminum foil having a thickness of 20 μm was used for a foil. N-methyl-2-pyrrolidone (NMP) was added to a mixture of the positive active material, the conductive additive and the binder, and the resulting mixture was kneaded, applied on the foil, dried, and then subjected to pressing. Incidentally, porosity after pressing was set to 33% in the case where the undercoat layer was not disposed, and 40% in the case where the undercoat layer was disposed.

(1-2) Preparation of Negative Electrode

A hard carbon (HC: non-graphitizable carbon) or a graphite was used as the negative active material. Further, PVDF was used for the binder, and these materials were mixed so that the percentages of the negative active material and the binder were 93% by mass and 7% by mass, respectively. Further, a copper foil having a thickness of 10 μm was used for a negative substrate layer. N-methyl-2-pyrrolidone (NMP) was added to a mixture of the negative active material, the conductive additive and the binder, and the resulting mixture was kneaded, applied on the foil, dried, and then subjected to pressing so that a porosity after pressing of the negative composite layer was 30%.

Incidentally, in Examples 1 to 44 and Comparative Examples 2 to 14, a hard carbon (HC) was used as the negative active material. In Comparative Example 1, graphite was used as the negative active material.

Further, in Examples 2 to 6 and Comparative Examples 2 to 5, the negative electrodes were prepared by varying the particle diameter D50 of the above negative active material within the range of 2 to 15 μm. In other Examples and Comparative Examples, the negative electrodes were prepared by setting the particle diameter D50 of the above negative active material to 5 μm.

Further, in each of Examples 1 to 6 and 40 to 44 and Comparative Examples 1 to 5 and 12 to 14, a negative electrode was prepared by setting the thickness of a negative composite layer to 35 μm, and the density of a negative composite layer to 1.13 g/cm³. Further, in each of Examples 7 to 39 and Comparative Examples 6 to 11, a negative electrode was prepared by varying the thickness of a negative composite layer within the range of 20 to 70 μm, and varying the density of a negative composite layer within the range of 1.00 to 1.13.

(1-3) Preparation of Separator

A polyolefin microporous membrane having air permeability of 140 sec/100 cc was used as the separator substrate layer.

Moreover, in each of Examples 1 to 20 and 40 to 44 and Comparative Examples 1 to 8 and 12 to 14, a separator was prepared by setting the thickness of a separator substrate layer to 15 μm, and in other Examples and Comparative Examples, a separator was prepared by setting the thickness of a separator substrate layer to 20 μm.

Moreover, in each of Examples 1 to 39 and Comparative Examples 1 to 11, a separator was prepared by setting the ratio of PC impregnation of the separator to 55%, and in Examples 40 to 44 and Comparative Examples 12 to 14, a separator was prepared by varying the ratio of PC impregnation of the separator within the range of 20 to 75%. Herein, the ratio of PC impregnation of a separator is a numeric value obtained by multiplying, by 100, a volume of PC contained in the separator by impregnation divided by a volume of the separator. Herein, the volume of the separator is the thickness of the separator multiplied by an area of a sample used in a test, and the volume of impregnated PC is an increment of a separator weight by impregnation divided by a PC density.

Herein, examples of a method of evaluating porosity of the separator include a method of using a porosity based on mercury intrusion porosimetry. The porosity based on mercury intrusion porosimetry is measured by applying high-pressure to the separator to intrude mercury into pores of the separator. In this case, it cannot be said that the amount of mercury intruded exactly reflects the amount of the nonaqueous electrolyte permeating the separator in an operating state of the energy storage device. On the other hand, the ratio of PC impregnation of the separator to be employed in the present example is determined by measuring the amount of propylene carbonate (PC) permeating the separator without applying high pressure to the separator, the propylene carbonate being actually used in a nonaqueous electrolyte of the energy storage device 10. Therefore, the ratio of PC impregnation of the separator reflects an impregnation amount of PC which is determined in consideration of factors interfering with permeation of the nonaqueous electrolyte such as wettability and surface energy of the separator and corresponds with the operating state of the energy storage device 10.

Further, inorganic particles (alumina particles), a binder (acrylic latex), a thickener, and a surfactant were mixed to prepare a coating material for forming an inorganic coating layer. The coating material was formulated so that the concentrations of the inorganic particle and the binder were 97% by mass and 3% by mass, respectively. The coating material was applied onto the separator substrate layer by a gravure coating method, and then dried at 80° C. for 12 hours to prepare an inorganic coating layer having a thickness of 5 μm. Moreover, a surface modification treatment of the separator substrate layer was appropriately carried out before coating and after coating for fine adjustment of wettability and a PC impregnation amount.

The surface modification treatment of the separator substrate layer was performed using corona discharge treatment equipment Corona Master PS-1M (manufactured by Shinko Electric & Instrumentation Co., Ltd.) with the conditions of the irradiation distance of 1 mm, the setup output power of 0 to 14 kV, the operation speed of 100 mm/sec. The ratio of PC impregnation of the separator was adjusted by controlling the setup output power and the operation number.

Here, a corrected negative electrode density represented by the following Equation 1 is defined as a parameter for evaluating the effect of the expansion/contraction of the negative substrate resulting from the reduction of the separator thickness.

Corrected negative electrode density=(Negative composite layer density)×(Negative composite layer thickness)/(Separator substrate layer thickness)  (Equation 1)

The corrected negative electrode density represents a density of the negative composite layer relative to a thickness of the separator.

Incidentally, in each of Examples 1 to 6 and 40 to 44 and Comparative Examples 1 to 5 and 12 to 14, a negative electrode and a separator were prepared by setting the corrected negative electrode density to 2.6 (g/cm$^3$), and in each of Examples 7 to 39 and Comparative Examples 6 to 11, a negative electrode and a separator were prepared by varying the corrected negative electrode density within the range of 0.9 to 5.7 (g/cm$^3$).

(1-4) Production of Nonaqueous Electrolyte

A nonaqueous electrolyte was prepared by dissolving LiPF6 as an electrolytic salt in a mixed solvent composed of propylene carbonate (PC), dimethyl carbonate (DMC) and ethyl methyl carbonate (EMC) in proportions of 3:2:5 (by volume) so as to have a concentration of 1 mol/L after preparation. In addition to this, a publicly known additive may be added as an additive.

(1-5) Preparation of Battery

A positive electrode, a negative electrode and a separator were superimposed in such a way that an inorganic coating layer is arranged between the separator substrate layer and the positive electrode, and the resulting electrode assembly was wound and collects a current, and then the electrode assembly was inserted into a box-like container, a nonaqueous electrolyte was injected, and the container opening was sealed.

Herein, evaluation tests of values in the positive and negative electrodes were carried out in the following manner. An average value of 10 samples was employed in all of these tests.

(2-1) Taking Positive Electrode from Battery

The battery was disassembled in a discharged state (2 V), and the positive electrode was taken out, adequately washed with DMC, and vacuum-dried at 25° C. In all of the following tests, samples after washing and drying were used.

(3-1) Taking Negative Electrode from Battery

The battery was disassembled in a discharged state (2 V), and the negative electrode was taken out, adequately washed with DMC, and vacuum-dried at 25° C. In all of the following tests, samples after washing and drying were used.

(3-2) Thickness of Negative Composite Layer of One Side

A thickness L of a portion onto which the negative composite was applied was measured with a micrometer. Thereafter, the composite was peeled by using acetone or NMP, and a thickness Lb of the foil after peeling the composite was measured. An application thickness of the negative composite layer of one side was determined from an equation (L−Lb)/2. Incidentally, a solvent to be used for peeling the composite is not particularly limited as long as it does not erode the negative substrate layer (foil). Further, measurement was carried out 5 times per sample, and an average value thereof was taken as a thickness of a negative composite layer of one side of one sample, and thicknesses of a negative composite layer of one side of five samples were averaged to obtain a thickness of a negative composite layer.

(3-3) Weight of Negative Electrode

Each negative electrode was cut out into a sample with a size of 2×2 cm$^2$, and weight (Ma) was measured. Thereafter, the negative composite layer was peeled by using acetone or NMP, and a weight (Mb) of the foil after peeling the composite was measured. An application weight of the negative composite layer of one side per unit area was determined from an equation (Ma−Mb)/8. Incidentally, a solvent to be used for peeling the negative composite layer is not particularly limited as long as it does not erode the foil. Further, measurement was carried out 5 times per sample, and an average value thereof was taken as a weight of a negative composite layer of one side of one sample, and weights of a negative composite layer of one side of ten samples were averaged to obtain a weight of a negative composite layer.

(3-4) Density of Negative Composite Layer

The density of the negative composite layer was calculated by (Weight of the negative composite layer per unit area)/(Thickness of the negative composite layer).

(3-5) Particle Diameter D50 of Negative Active Material

The negative electrode was subjected to cross section polisher (CP) processing, and the resulting cross section was observed with a SEM. Diameters of at least 500 active material particles selected at random were measured, and a cumulative volume from the small diameter in a particle diameter distribution was determined considering the particle to be spherical, and a particle diameter at which the cumulative volume reaches 50% was taken as a particle diameter D50.

Next, the following values were determined to perform a battery evaluation test. An average value of 3 samples was employed in all of these tests.

(4-1) Verification Test of Capacity

The following tests were performed in a constant-temperature oven maintained at 25° C. First, (4-1a) the constant current discharge test was carried out at a discharge current of 4 A to 2.4 V of a lower limit voltage, and then (4-1b) the constant current constant voltage charge of a charge current of 4 A was carried out at an upper limit voltage of 4.1 V for 3 hours, and then the constant current discharge test was carried out at a discharge current of 4 A to 2.4 V of a lower limit voltage. A current capacity at the time of discharge of (4-1b) was taken as a battery capacity.

(4-2) Power Output Test at 25° C.

1 C(A) was determined from the last capacity verification test, and the battery was charged at 25° C. for one hour and at 0.5 C(A) from the discharged state to adjust a SOC (state of charge) of the battery to 50%.

Then, the discharge was carried out at 25° C. and at a current of 40 C(A), and resistance at one second D1 was calculated from the formula, Resistance at one second D1=(Difference between voltage at one second and voltage before current-carrying)/current, and the power at one second W1 was calculated from the formula, Power at one second W1=(Voltage before current-carrying–lower limit voltage)/D1×(lower limit voltage). Also, similarly, resistance at ten seconds D2 was calculated from the formula, Resistance at ten second D2=(Difference between voltage at ten seconds and voltage before current-carrying)/current, and the power at ten seconds W2 was calculated from the formula, Power at ten seconds W2=(Voltage before current-carrying–lower limit voltage)/D2×(lower limit voltage).

(4-3) Test of Transient Power Degradation after High-Rate Cycle

After a battery was charged to 4.1 V at a constant current of 4 A at 25° C., the constant voltage charge was carried out at 4.1 V until a total charging time reached 3 hours, and then the constant current discharge was carried out to 2.4 V and a discharge capacity at this time was denoted by Q1 (Ah). A current value at the time when the discharge capacity Q1 (Ah) is discharged in an hour is taken as 1 CA. A SOC of the battery is adjusted to 50% by charging the battery in a discharged state (SOC 0%) at 0.5 CA at 25° C. for 1 hour. This battery is discharged at 20 CA for 10 seconds, and resistance before a cycle is determined from the following Equation 2.

$$\text{Resistance} = \{(\text{Voltage before current-carrying}) - (\text{voltage at ten seconds})\}/\text{current} \quad \text{(Equation 2)}$$

The SOC of the battery is adjusted to 50% again. A charge-discharge cycle is repeated 1000 times in an atmosphere of 25° C., the cycle including continuous discharge at 15 CA for 30 seconds and continuous charge at 15 CA for 30 seconds and carried out within 2 minutes. The battery after the cycles is discharged at 20 CA for 10 seconds within two hours of completion of the cycles, and resistance after cycles is determined from the above Equation 2. The resistance before cycles is denoted by D1 and the resistance after cycles is denoted by D2, and a transient power degradation rate after high-rate cycle is calculated by the following Equation 3.

$$\text{Transient power degradation rate (\%)} = D2/D1 \times 100 \quad \text{(Equation 3)}$$

That is, the transient power degradation rate is an index indicating the transient power degradation after the high-rate cycle of a battery. The transient power degradation rate in Example 1 is taken as 100%, and the transient power degradation rates in each of Examples 2 to 44 and Comparative Examples 1 to 14 are represented by a percentage to the transient power degradation rate of Example 1.

(4-4) Incidence Rate of Micro Short-Circuit

A ratio (%) of a battery, in which a difference (reduction of a battery voltage) between a battery voltage before storage and a battery voltage after storage is 0.1 V or more when after battery formation, a battery is charged to 20% of a rated capacity and stored at 25° C. for 20 days, is defined as an incidence rate of a micro short-circuit. Incidentally, in the present example, after a constant voltage charge of a charge voltage of 3.1 V was carried out for 3 hours, a voltage was measured between a lapse of one hour and a lapse of 12 hours and a voltage was measured again after storage at 25° C. for 20 days, and a difference between these measured voltage is defined as a reduction of a battery voltage. This test was carried out for 20 cells per one example, and the above-mentioned ratio of a battery was calculated and designated as an incidence rate of a micro short-circuit.

Next, the air permeability of the separator (substrate layer) was measured in the following manner.

(5-1) Pre-Treatment

The separator was drawn out from the battery, immediately washed with dimethyl carbonate (DMC), and then dried at 25° C. until a separator weight does not change. In all of the following tests, samples after washing and drying were used.

(5-2) Thickness of Separator

A thickness L of a separator was measured with a micrometer. Thicknesses of five samples were averaged to obtain a thickness of a separator.

(5-3) Separator PC Impregnation Ratio

After the separator was cut out into a sample with a size of 4×4 cm$^2$, a sample weight was measured to be designated as a weight before impregnation. The separator was immersed in PC (propylene carbonate) for 1 minute and pulled up, and excessive PC adhering to the surface was removed by wiping the separator with a paper wiper made of a pulp, and a weight of the separator was measured to be designated as a weight after impregnation.

(5-4) Entire Separator Air Permeability Test

On a post-pretreatment separator, air permeability of an entire separator (entire separator air permeability) was acquisitioned by measuring a time required for air of 100 cc per an area specified by a Gurley method (JIS 8117) to transmit the separator. When the separator does not have an inorganic coating layer (has only a substrate layer), this entire separator air permeability is air permeability of a substrate layer of a separator (separator substrate air permeability).

(5-5) Method of Acquisitioning Substrate Air Permeability of Separator Including Inorganic Coating Layer A separator is immersed in a solution composed of water and ethanol in proportions of 50:50 (by volume), and is subjected to ultrasonic cleaning. After ultrasonic cleaning, an inorganic coating layer side of the separator is observed with a light microscope, ultrasonic cleaning is repeatedly carried out until a residue of the inorganic coating layer disappears. In this case, it is necessary to be careful not to alter the quality of the separator substrate layer due to excessive increase of a temperature of the solution. Then, the air permeability of the separator which is free from the inorganic coating layer after the ultrasonic cleaning is measured and the measurement is designated as separator substrate air permeability.

As described above, the transient power degradation rates of batteries of Examples 1 to 44 and Comparative Examples 1 to 14, which were prepared by varying the type of a negative active material, the particle diameter D50 of a negative electrode, the corrected negative electrode density and the ratio of PC impregnation of the separator, are shown in Tables 1 to 3 below.

First, using the following Table 1, Examples 1 to 6 and Comparative Examples 1 to 5 will be described. As shown in the following Table 1, Examples 1 to 6 and Comparative Examples 2 to 5 represent the transient power degradation rates after the high-rate cycle in fixing the type of a negative active material (HC), the corrected negative electrode density and the ratio of PC impregnation of the separator, and varying the particle diameter D50 of a negative electrode.

Comparative Example 1 represents the transient power degradation rates after the high-rate cycle in setting the particle diameter D50 of a negative electrode, the corrected negative electrode density and the ratio of PC impregnation of the separator to the same as those in Example 1, and changing the type of a negative active material to graphite.

Incidentally, "Negative Active Material" in Table 1 represents a kind of a material used for the negative active material, "Negative Electrode Particle Diameter D50" represents a particle diameter D50 of the negative active material, "Corrected Negative Electrode Density" represents a corrected negative electrode density defined by the above Equation 1 and represents a density of the negative composite layer relative to the thickness of the separator, and "Separator PC Impregnation Ratio" represents a mass ratio (propylene carbonate impregnation weight/separator mass) of propylene carbonate with which the separator is impregnated to the separator. Further, "Transient Power Degradation Rate" represents a ratio expressed as a percentage of the resistance (D2) after the high-rate cycle to the resistance (D1) before the high-rate cycle. Further, the descriptions of Tables 2 and 3 described later are similar to those of Table 1.

TABLE 1

| | Negative Active Material | Negative Electrode Particle Diameter D50 (μm) | Corrected Negative Electrode Density (g/cm³) | Separator PC Impregnation Ratio (%) | Transient Power Degradation Rate (%) |
|---|---|---|---|---|---|
| Example 1 | HC | 5.0 | 2.6 | 55 | 100 |
| Example 2 | HC | 2.0 | 2.6 | 55 | 103 |
| Example 3 | HC | 3.0 | 2.6 | 55 | 98 |
| Example 4 | HC | 4.0 | 2.6 | 55 | 98 |
| Example 5 | HC | 5.0 | 2.6 | 55 | 101 |
| Example 6 | HC | 6.0 | 2.6 | 55 | 104 |
| Comparative Example 1 | Graphite | 5.0 | 2.6 | 55 | 125 |
| Comparative Example 2 | HC | 1.5 | 2.6 | 55 | 118 |
| Comparative Example 3 | HC | 7.0 | 2.6 | 55 | 1000 cycles impossible |
| Comparative Example 4 | HC | 10.0 | 2.6 | 55 | 1000 cycles impossible |
| Comparative Example 5 | HC | 15.0 | 2.6 | 55 | 1000 cycles impossible |

Figure 4:
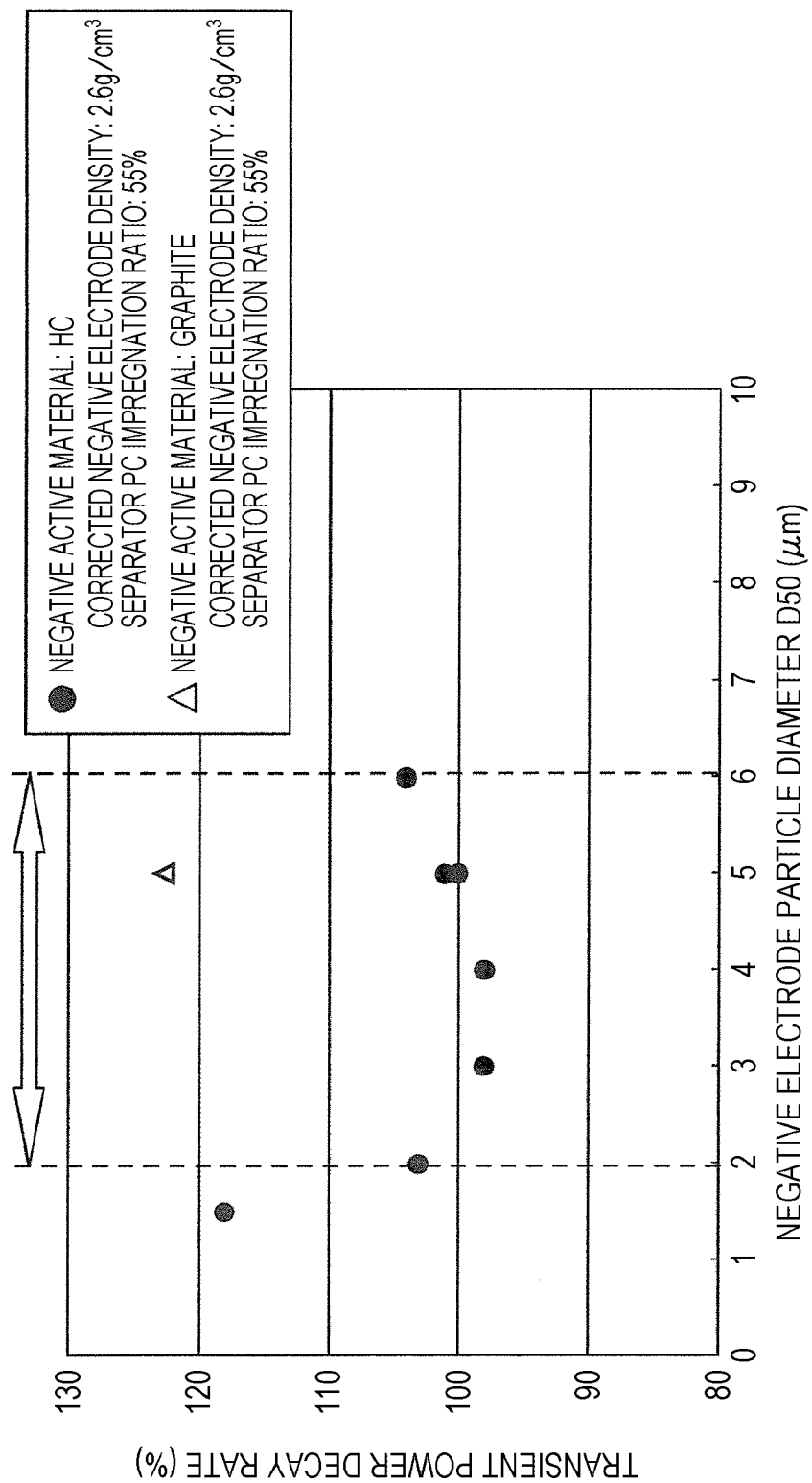
FIG. 4 is a view showing a transient power degradation rate in varying a particle diameter D50 of a negative electrode.

Further, FIG. 4 is a view showing the transient power degradation rate in varying the particle diameter D50 of a negative electrode. Specifically, FIG. 4 is a graph with "Negative Electrode Particle Diameter D50" in Table 1 on the horizontal-axis and "Transient Power Degradation Rate" in Table 1 on the vertical-axis.

As shown in the above Table 1 and FIG. 4, an increase of the transient power degradation rate is suppressed when the negative active material is a hard carbon (HC) having the particle diameter D50 of 2.0 μm to 6.0 μm (Examples 1 to 6). That is, the transient power degradation after the high-rate cycle can be suppressed.

Incidentally, as shown in Table 1, in Comparative Examples 3 to 5 in which the particle diameter D50 of a negative electrode was 7 μm or more, it was impossible to repeat the charge-discharge cycle at a high rate 1000 times. The reason for this is likely that when the particle diameter of the negative active material is larger, charge depth variation between particles of the negative active material (principally in an in-plane direction) becomes remarkable.

Further, in Comparative Example 2 in which the particle diameter D50 of a negative electrode was 1.5 μm, the transient power degradation rate after the high-rate cycle was increased. The reason for this is likely that the binder became insufficient because of an extremely small particle diameter, and therefore electrical continuity in the negative electrode became defective during repeating the cycles.

Further, when the negative active material is graphite (Comparative Example 1), the transient power degradation rate after the high-rate cycle was increased. It is considered that when the graphite is used as the negative active material, since there is little SOC-potential gradient, a recovery function of variations of charge-discharge is deteriorated, and moreover a charge-discharge cycle degradation easily proceeds. In the energy storage device 10 of the present embodiment, a hard carbon (non-graphitizable carbon) in which a particle diameter is regulated is used as the negative active material. It is considered that thereby, the resistance of the ion pathway during charge/discharge is uniformized, and moreover variations of charge-discharge depth in the negative electrode are suppressed by an inclined SOC-potential gradient, and therefore the transient power degradation rate after the high-rate cycle is suppressed.

From the results shown in Table 1 and FIG. 4, the energy storage device 10 according to the present embodiment comprises a positive electrode 410, a negative electrode 420 and a separator 430, and the negative electrode 420 contains a non-graphitizable carbon having a particle diameter D50 of 2.0 μm or more and 6.0 μm or less as a negative active material.

Next, using the following Table 2, Examples 1 and 7 to 39, and Comparative Examples 6 to 11 will be described. As shown in the following Table 2, Examples 1 and 7 to 39, and Comparative Examples 6 to 11 represent the transient power degradation rates after the high-rate cycle in fixing the type of a negative active material (HC), the particle diameter D50 of a negative electrode and the ratio of PC impregnation of the separator, and varying the corrected negative electrode density.

Incidentally, "Separator Substrate Layer Thickness" in Table 2 represents a thickness of the separator substrate layer, and "Negative Composite Layer Thickness" represents a thickness of the negative composite layer, and "Negative Composite Layer Density" represents a density by weight of the negative composite layer.

TABLE 2

| | Negative Active Material | Negative Electrode Particle Diameter D50 (μm) | Corrected Negative Electrode Density (g/cm$^3$) | Separator PC Impregnation Ratio (%) | Transient Power Degradation Rate (%) | Separator Substrate Layer Thickness (μm) | Negative Composite Layer Thickness (μm) | Negative Composite Layer Density (g/cm$^3$) |
|---|---|---|---|---|---|---|---|---|
| Example 1 | HC | 5.0 | 2.6 | 55 | 100 | 15 | 35 | 1.13 |
| Example 7 | HC | 5.0 | 2.1 | 55 | 103 | 15 | 28 | 1.13 |
| Example 8 | HC | 5.0 | 1.2 | 55 | 108 | 15 | 16 | 1.13 |
| Example 9 | HC | 5.0 | 3.0 | 55 | 102 | 15 | 40 | 1.13 |
| Example 10 | HC | 5.0 | 3.8 | 55 | 103 | 15 | 50 | 1.13 |
| Example 11 | HC | 5.0 | 4.4 | 55 | 104 | 15 | 58 | 1.13 |
| Example 12 | HC | 5.0 | 5.1 | 55 | 110 | 15 | 67 | 1.13 |
| Example 13 | HC | 5.0 | 1.4 | 55 | 109 | 15 | 20 | 1.05 |
| Example 14 | HC | 5.0 | 1.6 | 55 | 109 | 15 | 23 | 1.05 |
| Example 15 | HC | 5.0 | 2.0 | 55 | 108 | 15 | 28 | 1.05 |
| Example 16 | HC | 5.0 | 2.5 | 55 | 101 | 15 | 35 | 1.05 |
| Example 17 | HC | 5.0 | 2.8 | 55 | 99 | 15 | 40 | 1.05 |
| Example 18 | HC | 5.0 | 3.5 | 55 | 100 | 15 | 50 | 1.05 |
| Example 19 | HC | 5.0 | 4.1 | 55 | 103 | 15 | 58 | 1.05 |
| Example 20 | HC | 5.0 | 4.7 | 55 | 109 | 15 | 67 | 1.05 |
| Example 21 | HC | 5.0 | 1.3 | 55 | 109 | 20 | 23 | 1.13 |
| Example 22 | HC | 5.0 | 1.6 | 55 | 108 | 20 | 28 | 1.13 |
| Example 23 | HC | 5.0 | 2.0 | 55 | 108 | 20 | 35 | 1.13 |
| Example 24 | HC | 5.0 | 2.3 | 55 | 103 | 20 | 40 | 1.13 |
| Example 25 | HC | 5.0 | 2.8 | 55 | 98 | 20 | 50 | 1.13 |
| Example 26 | HC | 5.0 | 3.3 | 55 | 99 | 20 | 58 | 1.13 |
| Example 27 | HC | 5.0 | 3.8 | 55 | 100 | 20 | 67 | 1.13 |
| Example 28 | HC | 5.0 | 4.2 | 55 | 100 | 20 | 75 | 1.13 |
| Example 29 | HC | 5.0 | 1.2 | 55 | 111 | 20 | 23 | 1.05 |
| Example 30 | HC | 5.0 | 1.5 | 55 | 109 | 20 | 28 | 1.05 |
| Example 31 | HC | 5.0 | 1.8 | 55 | 108 | 20 | 35 | 1.05 |
| Example 32 | HC | 5.0 | 2.1 | 55 | 108 | 20 | 40 | 1.05 |
| Example 33 | HC | 5.0 | 2.6 | 55 | 100 | 20 | 50 | 1.05 |
| Example 34 | HC | 5.0 | 3.1 | 55 | 99 | 20 | 58 | 1.05 |
| Example 35 | HC | 5.0 | 3.5 | 55 | 101 | 20 | 67 | 1.05 |
| Example 36 | HC | 5.0 | 3.9 | 55 | 103 | 20 | 75 | 1.05 |
| Example 37 | HC | 5.0 | 1.2 | 55 | 111 | 20 | 23 | 1.00 |
| Example 38 | HC | 5.0 | 1.4 | 55 | 110 | 20 | 28 | 1.00 |
| Example 39 | HC | 5.0 | 1.8 | 55 | 109 | 20 | 35 | 1.00 |
| Comparative Example 6 | HC | 5.0 | 0.9 | 55 | 121 | 15 | 12 | 1.13 |
| Comparative Example 7 | HC | 5.0 | 5.7 | 55 | 121 | 15 | 75 | 1.13 |
| Comparative Example 8 | HC | 5.0 | 5.3 | 55 | 119 | 15 | 75 | 1.05 |
| Comparative Example 9 | HC | 5.0 | 1.1 | 55 | 118 | 20 | 20 | 1.13 |
| Comparative Example 10 | HC | 5.0 | 1.1 | 55 | 118 | 20 | 20 | 1.05 |
| Comparative Example 11 | HC | 5.0 | 1.0 | 55 | 123 | 20 | 20 | 1.00 |

Figure 5:
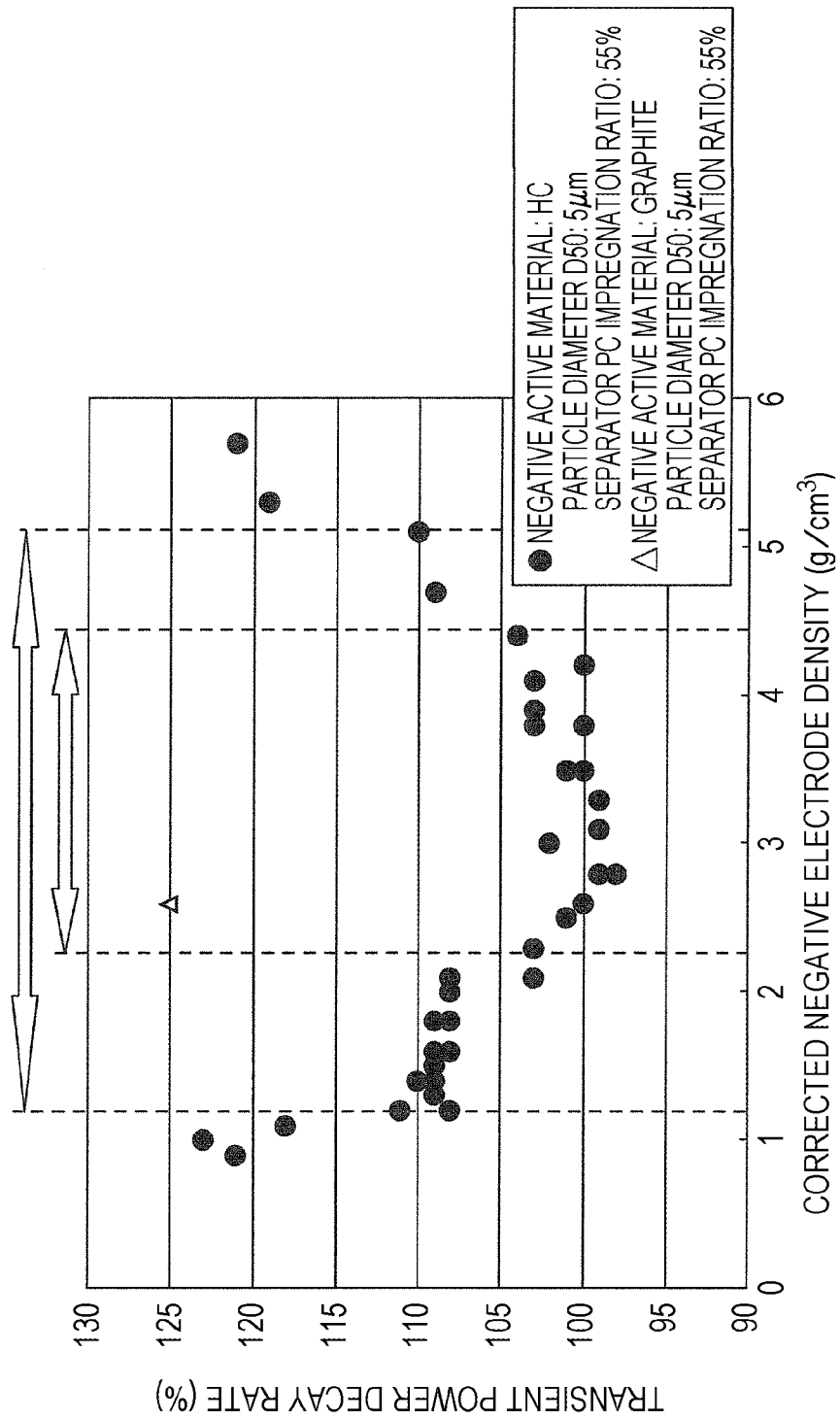
FIG. 5 is a view showing a transient power degradation rate in varying a corrected negative electrode density.

Further, FIG. 5 is a view showing the transient power degradation rate in varying the corrected negative electrode density. Specifically, FIG. 5 is a graph with "Corrected Negative Electrode Density" in Table 2 on the horizontal-axis and "Transient Power Degradation Rate" in Table 2 on the vertical-axis.

As shown in the above Table 2 and FIG. 5, when the corrected negative electrode density is 1.2 (g/cm$^3$) or more and 5.1 (g/cm$^3$) or less (Examples 1, 7 to 39), an increase of the transient power degradation rate after the high-rate cycle can be suppressed. Further, when the corrected negative electrode density is 2.2 (g/cm$^3$) or more and 4.4 (g/cm$^3$) or less (Examples 1, 9 to 11, 16 to 19, 24 to 28, and 33 to 36), an increase of the transient power degradation rate after the high-rate cycle can be further suppressed. As a result of this, in the present embodiment, the corrected negative electrode density is 1.2 (g/cm$^3$) or more and 5.1 (g/cm$^3$) or less, and preferably 2.2 (g/cm$^3$) or more and 4.4 (g/cm$^3$) or less.

Next, using the following Table 3, Examples 1 and 40 to 44, and Comparative Examples 12 to 14 will be described. As shown in the following Table 3, Examples 1 and 40 to 44, and Comparative Examples 12 to 14 represent the transient power degradation rates after the high-rate cycle in fixing the type of a negative active material (HC), the particle diameter D50 of a negative electrode and the corrected negative electrode density, and varying the ratio of PC impregnation of the separator.

Incidentally, "Incidence Rate of Micro Short-Circuit" in Table 3 indicates an incidence rate of a micro short-circuit of the energy storage device 10.

TABLE 3

|  | Negative Active Material | Negative Electrode Particle Diameter D50 (μm) | Corrected Negative Electrode Density (g/cm³) | Separator PC Impregnation Ratio (%) | Transient Power Degradation Rate (%) | Incidence Rate of Micro Short-Circuit (%) |
|---|---|---|---|---|---|---|
| Example 1 | HC | 5.0 | 2.6 | 55 | 100 | 0 |
| Example 40 | HC | 5.0 | 2.6 | 40 | 103 | 0 |
| Example 41 | HC | 5.0 | 2.6 | 45 | 103 | 0 |
| Example 42 | HC | 5.0 | 2.6 | 60 | 99 | 0 |
| Example 43 | HC | 5.0 | 2.6 | 65 | 97 | 0 |
| Example 44 | HC | 5.0 | 2.6 | 70 | 97 | 0 |
| Comparative Example 12 | HC | 5.0 | 2.6 | 20 | 110 | 0 |
| Comparative Example 13 | HC | 5.0 | 2.6 | 35 | 109 | 0 |
| Comparative Example 14 | HC | 5.0 | 2.6 | 75 | 98 | 20 |

Figure 6:
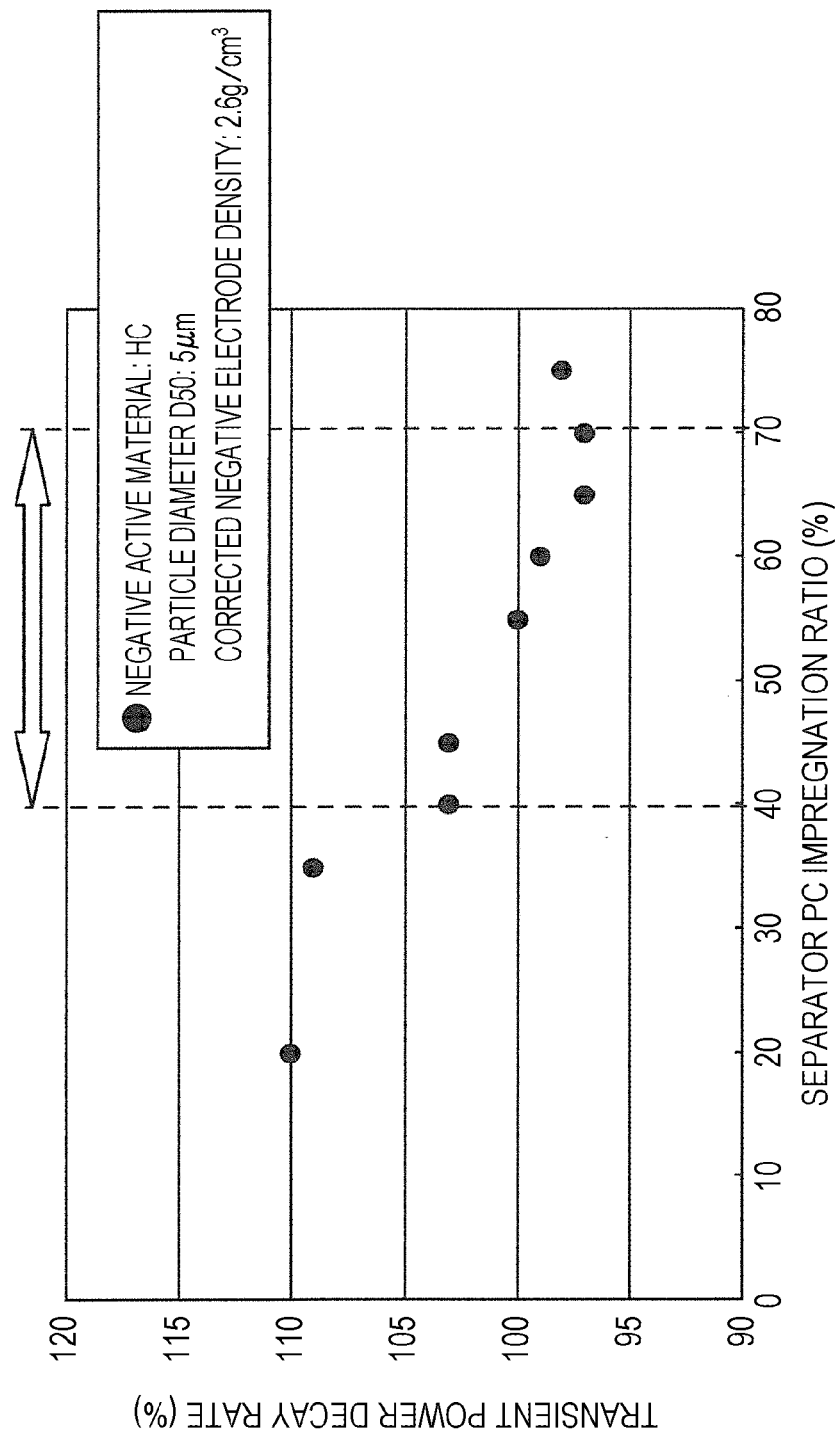
FIG. 6 is a view showing a transient power degradation rate in varying a ratio of PC impregnation of a separator.

FIG. 6 is a view showing a transient power degradation rate in varying the ratio of PC impregnation of the separator. Specifically, FIG. 6 is a graph with "Separator PC Impregnation Ratio" in Table 3 on the horizontal-axis and "Transient Power Degradation Rate" in Table 3 on the vertical-axis.

As shown in the above Table 3 and FIG. 6, when a separator having the characteristic that a ratio of PC impregnation of the separator is 40% or more and 70% or less is used (Examples 1 and 40 to 44), an increase of the transient power degradation rate after the high-rate cycle can be suppressed. As a result of this, in the present embodiment, it is preferred that the separator 430 has the characteristic that a ratio of PC impregnation of the separator is 40% or more and 70% or less.

Incidentally, as shown in Table 3, in Comparative Example 14 in which the ratio of PC impregnation of the separator is 75%, the transient power degradation rate is low but the micro short-circuit occurs. The reason for this is likely that the surface modification treatment was excessive, and therefore separator strength was significantly reduced, resulting in the occurrence of the separator-penetration short circuit due to burrs.

SUMMARY

As described above, the energy storage device 10 according to the present embodiment comprises a positive electrode 410, a negative electrode 420 and a separator 430 arranged between the positive electrode 410 and the negative electrode 420, the negative electrode 420 has a negative substrate layer 421 and a negative composite layer 422 arranged on the surface of the negative substrate layer 421, and the separator 430 has a separator substrate layer 431. The negative composite layer 422 contains a non-graphitizable carbon having a particle diameter D50 of 2.0 μm or more and 6.0 μm or less as a negative active material, and the corrected negative electrode density is 1.2 (g/cm³) or more and 5.1 (g/cm³) or less. Herein, the present inventors made earnest investigations and repeated experiments, and consequently they found that even when the thickness of the separator 430 is reduced, it is possible to reduce the influence which the separator 430 draws from the negative electrode 420, and it is possible to suppress the transient power degradation after the high-rate cycle resulting from the ununiformity of a current distribution due to the constitution of the energy storage device 10 which includes the above-mentioned negative composite layer 422 and has the corrected negative electrode density within the above range. Thereby, a transient power degradation after the high-rate cycle can be suppressed in the energy storage device 10 in which the thickness of the separator 430 is reduced.

Further, the present inventors made earnest investigations and repeated experiments, and consequently they found that the transient power degradation after the high-rate cycle can be suppressed when the separator 430 has the characteristic that a ratio of PC impregnation of the separator, which represents a mass ratio between propylene carbonate (HC) contained in the separator by impregnation and the separator, is 40% or more and 70% or less. As a result of this, in the energy storage device 10, the occurrence of the micro short-circuit can also be suppressed while suppressing the transient power degradation after the high-rate cycle when using the separator 430 having the characteristic that a ratio of PC impregnation of the separator is 40% or more and 70% or less.

Further, the present inventors made earnest investigations and repeated experiments, and consequently they found that the transient power degradation after the high-rate cycle can be further suppressed when the corrected negative electrode density is 2.2 (g/cm³) or more and 4.4 (g/cm³) or less. As a result of this, in the energy storage device 10, it is possible to suppress the transient power degradation after the high-rate cycle more effectively when the corrected negative electrode density is 2.2 (g/cm³) or more and 4.4 (g/cm³) or less.

A thickness of the separator 430 is preferably 26 μm or less. Thereby, it is possible to increase a power and a capacity.

The separator 430 preferably further has an inorganic coating layer 432 arranged on the surface of the separator substrate layer 431. Thereby, the failure of the separator substrate layer 431 due to expansion/contraction of the positive electrode 410 and the negative electrode 420 is prevented, and the strength of the separator 430 can be kept.

The energy storage device 10 of the embodiment of the present invention has been described above; however, the present invention is not limited to the embodiment.

That is, the embodiments disclosed herein are intended to illustrate the invention in all respects and are not to be construed to limit the invention. The scope of the invention is defined by the appended claims rather than by the above-mentioned descriptions, and all modifications and variations which fall within the scope of the claims, or equivalence of the scope of the claims are therefore intended to embraced by the claims.

The present invention can be applied to the energy storage device capable of suppressing the transient power degradation after the high-rate cycle even when the thickness of the separator is reduced.

According to a first aspect of the present invention, the transient power degradation after the high-rate cycle can be suppressed in the energy storage device in which the thickness of the separator is reduced.

What is claimed is:

1. An energy storage device comprising:
    a positive electrode;
    a negative electrode;
    a separator arranged between the positive electrode and the negative electrode; and
    a nonaqueous electrolyte,
    wherein the negative electrode has a negative substrate layer, and a negative composite layer arranged on the surface of the negative substrate layer,
    the separator has a separator substrate layer,
    the negative composite layer contains a non-graphitizable carbon having a particle diameter D50 of 2.0 μm or more and 6.0 μm or less, and
    a corrected negative electrode density, which is defined as a value obtained by dividing, by a thickness of the separator substrate layer, a value obtained by multiplying a density of the negative composite layer by a thickness of the negative composite layer, is 1.2 (g/cm$^3$) or more and 5.1 (g/cm$^3$) or less.

2. The energy storage device according to claim 1, wherein a ratio of PC impregnation of the separator, which represents a mass ratio between propylene carbonate contained in the separator by impregnation and the separator, is 40% or more and 70% or less.

3. The energy storage device according to claim 1, wherein the corrected negative electrode density is 2.2 (g/cm$^3$) or more and 4.4 (g/cm$^3$) or less.

4. The energy storage device according to claim 1, wherein the separator has a thickness of 26 μm or less.

5. The energy storage device according to claim 1, wherein the separator further has an inorganic layer containing inorganic particles on the surface of the separator substrate layer.

6. An energy storage apparatus comprising:
    an energy storage device; and
    a bus bar member electrically connected to the energy storage device, wherein
    the energy storage device comprises:
      a positive electrode;
      a negative electrode;
      a separator arranged between the positive electrode and the negative electrode; and
      a nonaqueous electrolyte,
    the negative electrode has a negative substrate layer, and a negative composite layer arranged on the surface of the negative substrate layer,
    the separator has a separator substrate layer,
    the negative composite layer contains a non-graphitizable carbon having a particle diameter D50 of 2.0 μm or more and 6.0 μm or less, and
    a corrected negative electrode density, which is defined as a value obtained by dividing, by a thickness of the separator substrate layer, a value obtained by multiplying a density of the negative composite layer by a thickness of the negative composite layer, is 1.2 (g/cm$^3$) or more and 5.1 (g/cm$^3$) or less.

7. A method for charging or discharging an energy storage device, the method comprising:
    providing the energy storage device comprising a positive electrode, a negative electrode, a separator arranged between the positive electrode and the negative electrode, and a nonaqueous electrolyte; and
    at least one selected from the group consisting of charging and discharging the energy storage device, the charging comprising introducing electricity in an internal space of the energy storage device to store the electricity within the positive electrode, the negative electrode and the separator at 8 CA or more when an available discharge capacity is defined as 1CAh, the discharging comprising leading the electricity stored in the positive electrode, the negative electrode and the separator to an external space of the energy storage device at 8 CA or more when the available discharge capacity is defined as 1CAh, wherein
    the negative electrode has a negative substrate layer, and a negative composite layer arranged on the surface of the negative substrate layer,
    the separator has a separator substrate layer,
    the negative composite layer contains a non-graphitizable carbon having a particle diameter D50 of 2.0 μm or more and 6.0 μm or less, and
    a corrected negative electrode density, which is defined as a value obtained by dividing, by a thickness of the separator substrate layer, a value obtained by multiplying a density of the negative composite layer by a thickness of the negative composite layer, is 1.2 (g/cm$^3$) or more and 5.1 (g/cm$^3$) or less.

* * * * *